Figure 1:
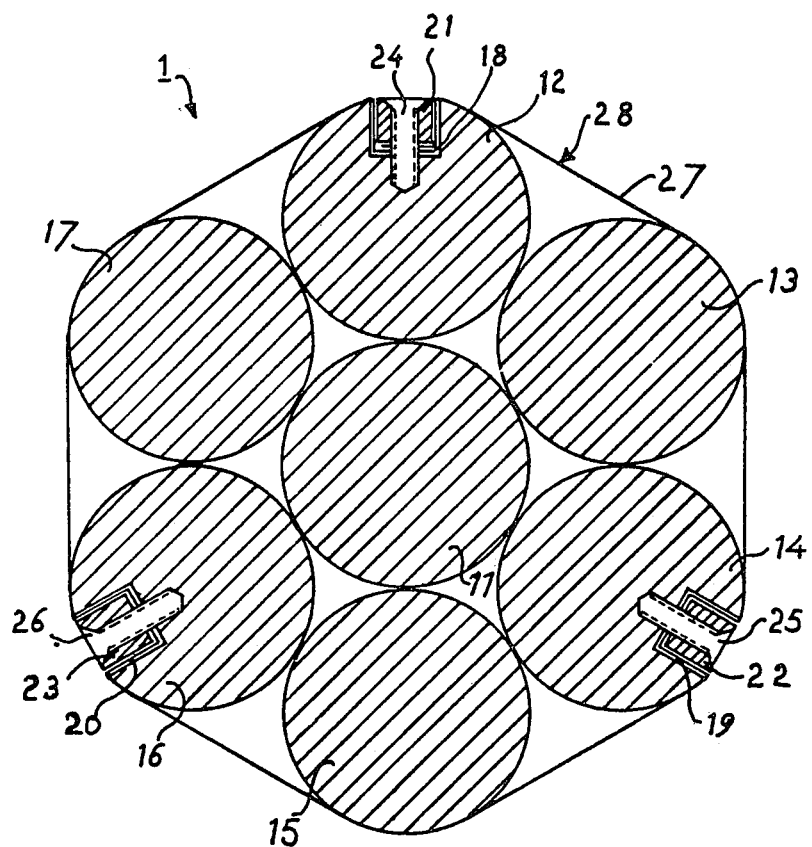

United States Patent [19]
Mulder et al.

[11] 4,362,363
[45] Dec. 7, 1982

[54] POLYGONAL MIRROR WITH TIGHTENED REFLECTING FOIL

[75] Inventors: Bernardus A. Mulder, Deurne; Bontko Witteveen, Venlo, both of Netherlands

[73] Assignee: OCÉ-Nederland B.V., Venlo, Netherlands

[21] Appl. No.: 205,999

[22] PCT Filed: Nov. 23, 1979

[86] PCT No.: PCT/NL79/00009
§ 371 Date: Jun. 25, 1980
§ 102(e) Date: Jun. 25, 1980

[87] PCT Pub. No.: WO80/01049
PCT Pub. Date: May 29, 1980

[30] Foreign Application Priority Data
Nov. 27, 1978 [NL] Netherlands ................ 7811599

[51] Int. Cl.³ .................... G02B 7/18; G02B 5/08
[52] U.S. Cl. ........................................ 350/299

[58] Field of Search ............... 350/310, 299, 288, 6.8, 350/6.5, 320; 358/206

[56] References Cited
U.S. PATENT DOCUMENTS
4,119,365 10/1978 Powell ........................... 350/293

Primary Examiner—Jon W. Henry
Attorney, Agent, or Firm—Albert C. Johnston

[57] ABSTRACT

A polygonal mirror is provided which presents a plurality of mirror surfaces arranged about an axis of rotation with all the mirror surfaces at the same inclination relative to that axis. The mirror comprises a reflecting foil tightened over a plurality of supporting elements arranged about the axis of rotation. Equal angles between the mirror surfaces are obtained by employing cylinders as the supporting elements. The cylinders all have the same outside diameter, and are placed together with each touching two neighboring cylinders and each in contact with a central cylinder the axis of which coincides with the axis of rotation.

21 Claims, 9 Drawing Figures

POLYGONAL MIRROR WITH TIGHTENED REFLECTING FOIL

The invention relates to a polygonal mirror, comprising a number of mirror surfaces arranged round an axis of rotation, each of which surfaces is inclined equally to the axis of rotation.

Such a polygonal mirror is known from the published Dutch Patent Application No. 7705514. In that application a process is described for the manufacture of a polygonal mirror to be rotated at high speed by which process an exactly formed multiangular master is provided, an aluminium preform is installed in the master and a thin film of plastics material is centrifugally cast against the aluminium preform in a replica process. With the process described in that application polygonal mirrors can be obtained, of which the mirror surfaces can be inclined at any angle to the axis of rotation. The centrifugal casting takes for instance place with an epoxy resin. After the epoxy resin has cured, the master is removed.

Such a process has disadvantages: due to the curing the epoxy resin shrinks slightly, so that the mirror which is obtained ultimately is not exactly the complementary image of the master. Therefore waste of mirrors which have not shrunk in the way expected, cannot be prevented. The master must be manufactured very precisely, which requires much skill. At a draft-angle of less than 30° the master should even consist of more parts. Stringent measures must then be taken in order to reposition the master parts exactly with regard to each other for each mirror to be manufactured.

It is an object of the present invention to provide a polygonal mirror which can be manufactured in a simpler way but which nevertheless can be made with high precision.

This object is achieved according to the invention in that a reflecting foil is tightened over a number of supporting elements arranged round the axis of rotation.

In this way a light, simple construction is obtained, which nevertheless yields a high precision polygonal mirror. A special advantage is, that the foil is the part with the greatest distance to the axis of rotation. In this way it has been achieved in the first place, that the centrifugal forces on the foil, which forces are proportional to the mass of the foil and to the distance from the axis of rotation, remain small because of the low mass of the foil. In the second place the moment of inertia of a polygonal mirror according to the invention is smaller than that of known polygonal mirrors of the same diameter. Consequently for the same angular velocity the rotational energy of a rotating polygonal mirror according to the invention is smaller than that of known polygonal mirrors. A small moment of inertia is also favourable for the driving and bearing of the polygonal mirror.

A preferred embodiment of a polygonal mirror according to the invention is one in which the supporting elements are installed rotationally symmetrically with regard to the axis of rotation and consist of six first cylinders, all with the same outer diameter, which are placed, each touching its two neighbours and each in contact with a central cylinder the axis of which coincides with the axis of rotation.

In this embodiment use is made of the known fact that a circle of any diameter is encircled exactly by six circles of the same diameter. As the outer diameters of all cylinders are equal to each other, the central cylinder is encircled very exactly and without interspace by the six first cylinders, which touch each other exactly. Thus in a simple way a very exact hexahedral mirror is obtained, the angles between neighbouring mirror surfaces necessarily amounting to exactly 120°. The equality of all outer diameters is achieved by exactly turning a bar of material such as aluminium or silver steel, with generally known means and subsequently dividing it into seven pieces. A first piece serves as central cylinder and the other six pieces form the six first cylinders.

A specially advantageous embodiment of a polygonal mirror according to the invention, in which the foil is shaped as a strip of which both ends are fixed in a groove in one of the supporting elements, is characterised in that in more supporting elements a groove is made, of which supporting elements the centre of gravity is substantially situated on the axis of rotation, and in that means are present to tighten the foil in each of the grooves.

In this way it is achieved, that the foil is tightened at more points, which is beneficial to the stiffness of the whole. It is also achieved, that the place of the centre of gravity of the polygonal mirror remains situated on the axis of rotation without the necessity of applying extra balancing means.

An embodiment of a polygonal mirror according to the invention, in which the foil is in the form of a strip and in which at least one fixing element is applied for the ends of the strip of foil, is characterised in that the fixing element comprises a tubular body with an inner space, which body is installed in parallel to the axis of rotation within the circumferential plane of the polygonal mirror, and in that it is provided with a feed slot for the foil into the inner space, and in that the fixing element comprises an inner part rotatable in the inner space, which inner part is provided with a groove for receiving at least one end of the strip of foil, which groove in an angular position of the inner part in the inner space is situated opposite to and in parallel to the feed slot, and in that means have been installed for fixing the inner part in the inner space.

In this way it is achieved, that with a few simple manipulations the strip of foil can be tightened and fixed, which manipulations are: inserting the ends of the strip through the feed slot into the groove in the inner part, rotating the inner part to tighten the strip and finally fixing the inner part in the inner space.

In a polygonal mirror according to the invention, in which the supporting elements consist of cylinders, such a fixing element preferably forms one of the cylinders.

The foil may consist of a metal foil or a metallised plastics foil; preferably it consists of a polyester foil coated at least on one side with a thin layer of aluminium.

Figure 2:
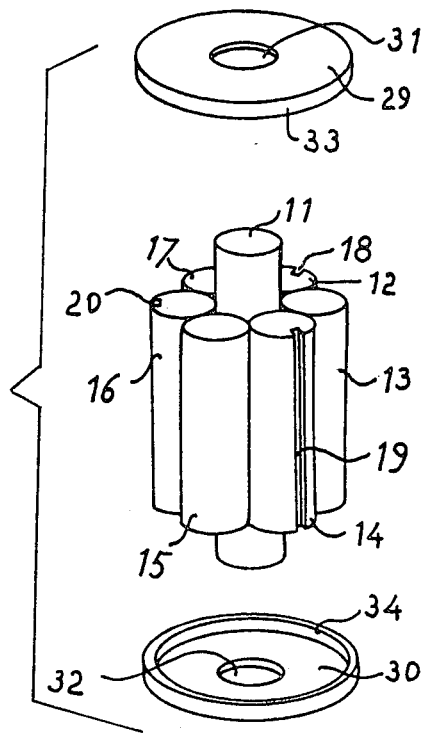
Figure 4:
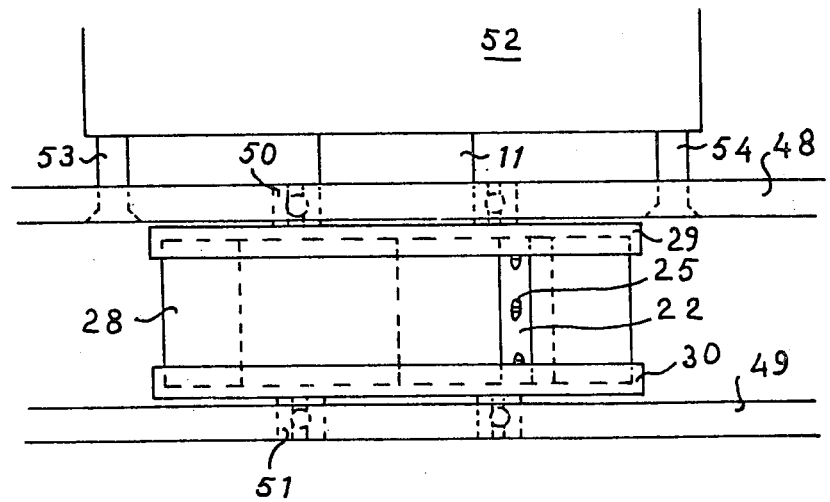
Figure 3:
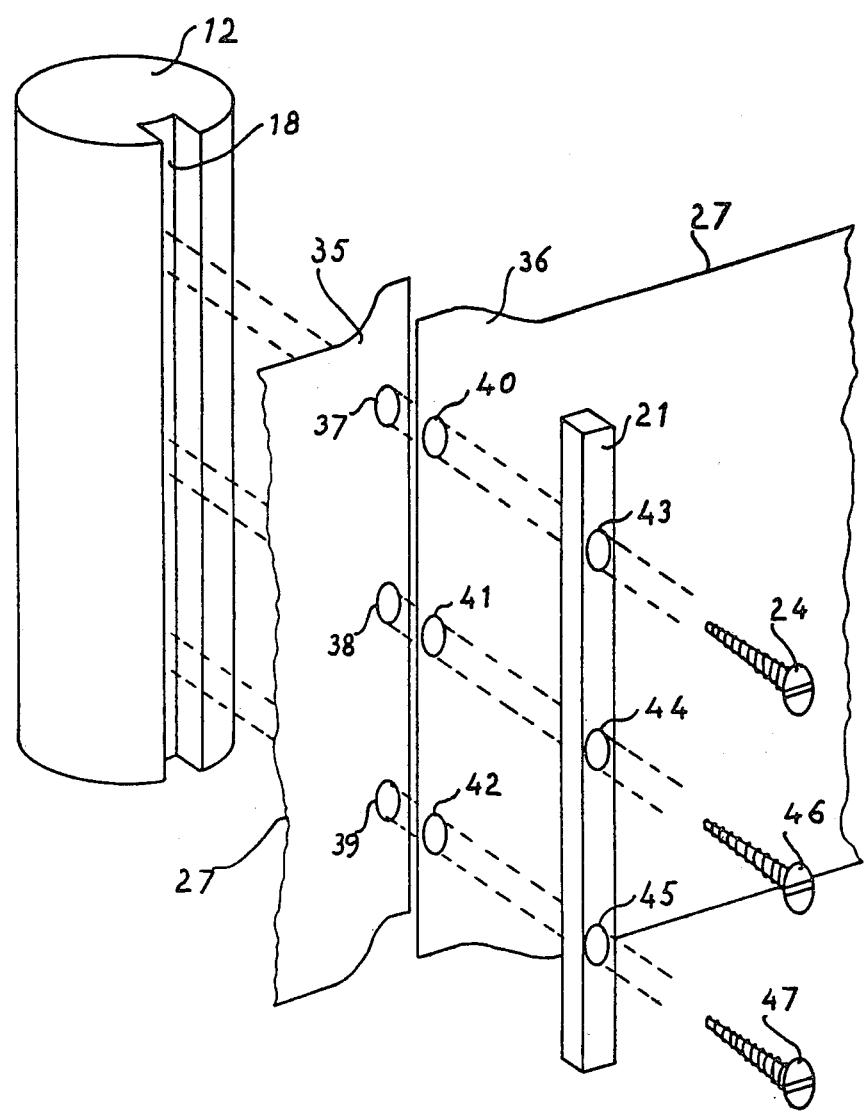
Figure 5:
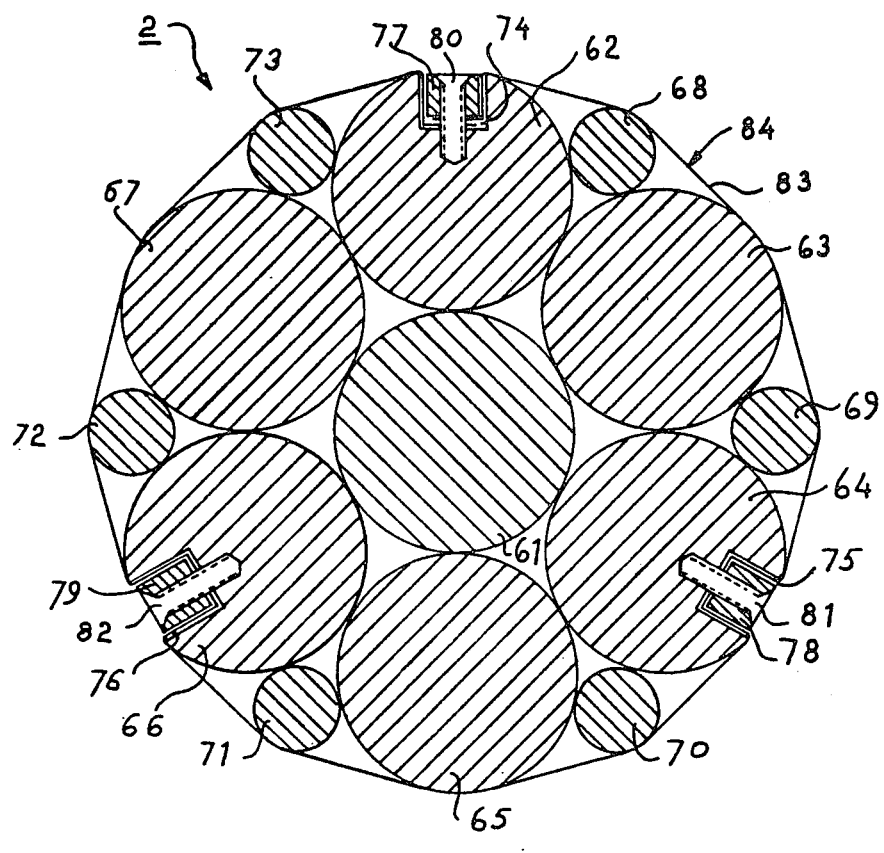
Figure 6:
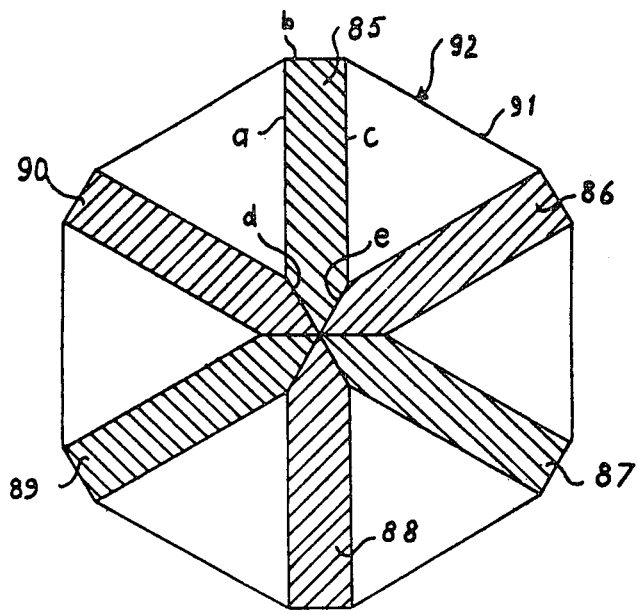
Figure 7:
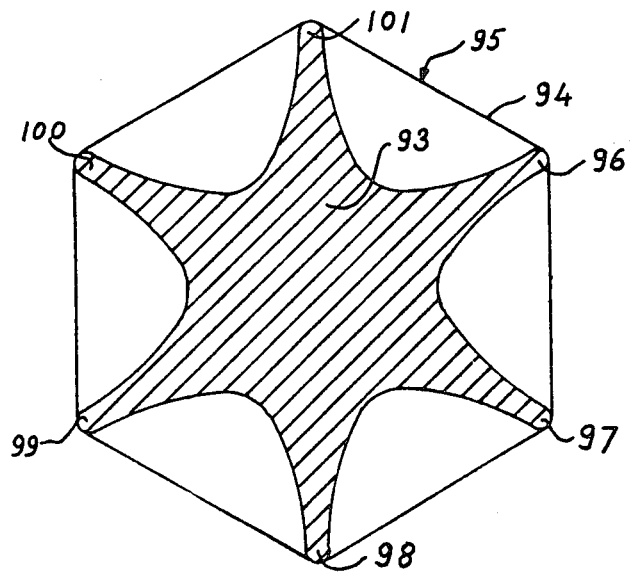
Figure 8:
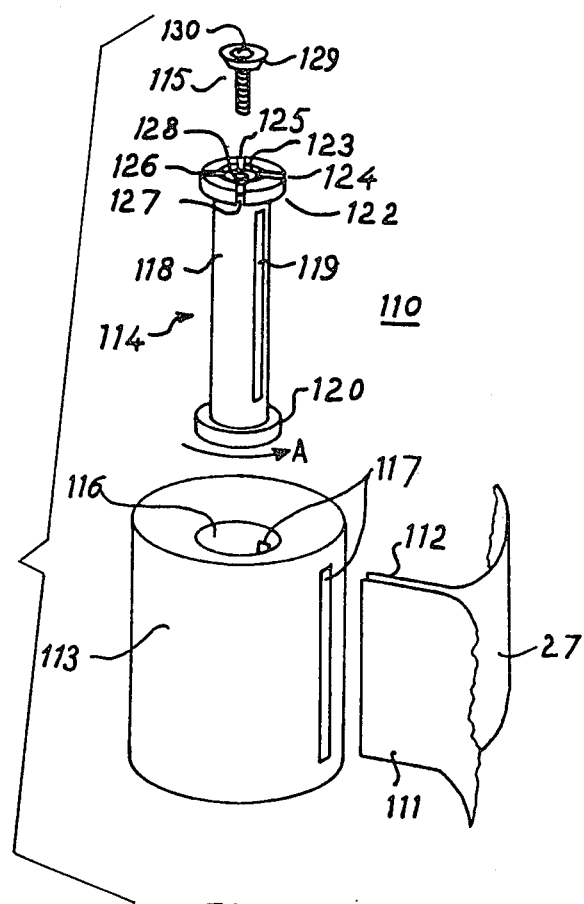
Figure 9:
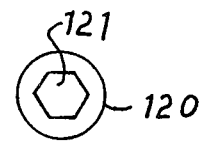

The invention is further explained and illustrated with the aid of the accompanying drawings, in which:

FIG. 1 is a cross section of a polygonal mirror according to the invention,

FIG. 2 is a perspective exploded view showing the construction of the polygonal mirror of FIG. 1, FIG. 3 shows in detail how the reflecting foil is fixed in a groove in one of the cylinders of the mirror according to FIG. 1, FIG. 4 is a side view of a mounted mirror, constructed in the fashion shown in FIG. 2, FIG. 5 is a cross section of a second embodiment of a polygonal mirror according to the invention, FIG. 6 is a cross section of a third embodiment of a polygonal mirror according to the invention, FIG. 7 is a cross section of a fourth embodiment of a polygonal mirror according to the invention, FIG. 8 shows the construction of another embodiment of a fixing element for the reflecting foil in exploded perspective view, and FIG. 9 is an under plan view of part of the fixing element shown in FIG. 8.

In FIG. 1, a rotatable polygonal mirror is denoted 1. This can rotate round an axis perpendicular to the plane of drawing and passing through the centre of a central cylinder 11. The cylinder 11 is surrounded by six cylinders 12, 13, 14, 15, 16 and 17. The cylinders 12, 14 and 16 are respectively provided with grooves 18, 19 and 20, in which bars 21, 22 and 23 are fitted, held in place by screws 24, 25 and 26, respectively.

A strip of foil 27, which is reflective on at least its outer side 28, runs round the cylinders 12 to 17, and its ends are fixed in the groove 18 as described below with reference to FIG. 3. The strip 27 is tightened firmly with the aid of the bars 22 and 23 in the grooves 19 and 20, respectively. The strip of foil 27 is a polyester foil, such as a polyethylene terephthalate foil, which is provided on side 28 with a thin layer of aluminium applied by evaporation.

Cylinders 11 to 17 all have the same outer diameter, which is achieved by turning a single bar of material exactly on a lathe and cutting into seven cylinders. Aluminium is a suitable material but instead of aluminium it is also possible to use silver steel or brass or another material that can be turned to form a long cylinder of the desired diameter.

As evident from FIG. 2 which shows the construction of the polygonal mirror, the long cylinder of the desired diameter is divided into seven cylinders, six of equal length and one longer cylinder. Before or after the division, three of the six equal length cylinders are provided with a groove in parallel to the cylinder axis. The longest cylinder forms the central cylinder 11, and the six other cylinders the cylinders 12 to 17, arranged in such a way that the cylinders with and without grooves alternate round the central cylinder 11. Covers 29 and 30 with raised edges 33 and 34, and with openings 31 and 32, respectively, are fitted over the central cylinder 11. The inner diameter of the raised edges 33 and 34 is equal to three times the outer diameter of one of the cylinders, so that a tight fit is obtained.

FIG. 3 shows how the ends 35 and 36 of the strip 27 are fixed in the groove 18 of the cylinder 12. The end 35 is provided with three holes 37, 38 and 39. The end 36 is likewise provided with three holes 40, 41 and 42. The bar 21 is also provided with three holes, 43, 44 and 45. In the groove 18 three threaded holes are present (not shown), in which the screws 24, 46 and 47 fit.

As is shown in FIG. 3, first the end 35 is laid in the groove 18, with holes 37, 38 and 39 registered with the threaded holes in groove 18. Subsequently, the end 36 is laid over the end 35 and the bar 21 is laid over the end 36, with the holes all registered. Finally the assembly is firmly fixed by inserting screws 24, 46 and 47 through the hole-combinations 43-40-37, 44-41-38, 45-42-39, respectively, and screwing them into the threaded holes in the groove 18. Where the strip 27 fits into the grooves 19 and 20 it is also provided with three holes, and is fixed likewise with the aid of the bars 22 and 23 and screws 25 and 26 into the grooves 19 and 20. In this way the strip 27 is tightened at three different places so that a smooth mirror surface is obtained. The cylinders 12, 14 and 16, in which the foil has been fixed, have been installed in such a way that their centre of gravity is situated substantially and the axis of the central cylinder 11, which is favourable for stability when the polygonal mirror is rotated at high speeds as is often the case.

FIG. 4 shows a completely polygonal mirror according to the invention mounted between two frame plates 48, 49. In frame plates 48 and 49 tightly fitting ball bearings 50 and 51 have been installed. The central cylinder 11, which is longer than the other six cylinders, is situated with one end tightly fitting in the ball bearings 51 and its other end passes through the ball bearing 50, and is connected with a drive motor 52. The drive motor 52 is fixed on frame plate 48 with the aid of bolts 53 and 54. The drive motor 52 is for instance a high speed motor, such as a Maxon d.c. motor type 2332.909, which can run at speeds of 10,000 r.p.m. or even higher.

The polygonal mirror shown in FIGS. 1 to 4 can be manufactured in a very simple way using techniques and machines which are available almost everywhere. However, it can be made to very high precision (in terms of planeness and reflection coefficient of the mirror surfaces and angles between the mirror surfaces). Known polygonal mirrors of a like degree of precision are many times more expensive in production cost than the polygonal mirrors according to the invention.

It is clear, that round and in contact with the central cylinder 11 more or fewer than six cylinders can be installed each touching its two neighbours, if only the exact diameter for those cylinders is chosen. If n equal diameter cylinders are installed, an n-hedral mirror is obtained after applying the foil, of which mirror the mirror surfaces coincide with the sides of a regular n-angle. The ratio between the diameter P of the central cylinder 11 and the diameter R of the cylinders installed round the central cylinder is in that case given by the relation $$\frac{P}{R} = \frac{1 - \sin(\pi/n)}{\sin(\pi/n)}.$$

It is possible to comply exactly with this relation by two turned cylinders, if for the turning use is made of a numerically controlled lathe.

In FIG. 5 a cross section is drawn of a dodecahedral mirror 2, which is constructed according to the same principle as the hexahedral mirror of FIG. 1. Round a central cylinder 61 are six first cylinders 62, 63, 64, 65, 66 and 67 all of the same diameter. Between and touching each adjacent pair of cylinders 62 to 67 are six second cylinder 68, 69, 70, 71, 72 and 73, all of the same diameter. The equality of the diameters of the cylinders 62 to 67 and of cylinders 68 to 73, is obtained as described above.

Cylinders 62, 64 and 66 are provided with grooves 74, 75 and 76, respectively, in which a foil 83, of which the side 84 is reflective, is fixed and tightened with the aid of bars 77, 78 and 79 and screws 80, 81 and 82, respectively, in the same way as shown in FIG. 3.

By a suitable selection of the ratio of the diameter of the cylinders 68 to 73 to that of cylinders 62 to 67, the angle between two successive mirror surfaces, is equal to an angle of a regular dodecagon.

Also in this case it is possible to make a 2N-hedral mirror, in such a way that N first cylinders with radius R are installed round and in contact with the central cylinder and N second cylinders with radius r are installed along the outer circumference of the N first cylinders each touching two of them. Starting from the condition that the mirror planes coincide with the planes of a regular 2N-angle, it can be calculated, that the ratio of the radii r and R satisfies the following relationship:

$$\frac{r}{R} = \frac{\tan X/2}{\tan X/4} [1 + 2\tan(X/2)\tan(X/4) - \sqrt{\tan^2(X/2)\tan^2(X/4) + \tan(X/2)\tan(X/4)}\,]$$

in which X is the magnitude of the angle of a regular 2N-angle. As X is known for any value of N, also the ratio r/R is known.

In FIG. 6 a cross section of a third embodiment of a polygonal mirror according to the invention is shown. This consists of a foil 91 with a reflective side 92 tightened round six equal supporting elements 85, 86, 87, 88, 89 and 90 of for instance aluminium, in the way as already described above, and not explicitly shown here. The supporting elements 85 to 90 are clamped between two covers (not shown) as already described in connection with FIG. 2. Each of the elements 85 to 90 is obtained by providing a long flat bar, e.g. of aluminium, and having parallel planes a and c at one side with a flat lateral side b which is inclined at right angles to the planes a and c. Side d is obtained by conveying the bar of aluminium with the plane a sliding on a table past a cutting device, which is inclined at an angle of 30° to the plane of the table, while the lateral edge b is conveyed past a guide ruler on the table. Side e is obtained by conveying the bar of aluminium once more over the same table, but now with the plane c touching the table surface. In that way it is achieved, that the angle between the planes d and e is exactly equal to 60°, so that also the angle between two successive supporting elements is equal to 60° and consequently the angle between successive mirror surfaces is equal to 120°. Also in this way an exact hexahedral mirror may be made inexpensively. It stands to reason, that also more or fewer than six supporting elements can be chosen, the angle between sides d and e being adapted accordingly.

In FIG. 7 a cross section of a fourth embodiment of a polygonal mirror according to the invention is shown, in which, round a star-shaped body 93, for instance of aluminium, a foil 94, for instance of polyester, having a reflective side 95 is tightened in the known way which is not explicitly drawn. The star-shaped body 93 is obtained by pulling an injection moulded bar of aluminium of almost the exact shape and dimensions through a mould. Such a mould can be manufactured in a much simpler way than the master which is described in published Dutch Patent Application 7705514. Only the ends 96, 97, 98, 99, 100 and 101 of the star-shaped body 93 need to be situated on an exactly determined distance from its centre, so that the number of processing steps to the mould is much smaller than the number of processing steps to the master described in the above-mentioned patent application. Although a hexagram-shaped body is shown in FIG. 7, it is clear, that more or fewer ends are equally well possible without affecting the essence of the invention.

FIG. 8 shows a particularly advantageous embodiment of a fixing element 110 for the ends 111 and 112 of the strip of foil 27. The fixing element 110 consists of a tubular body 113, an inner part 114 and a screw 115 with a conical head. The tubular body 113 is shown here as a cylinder which is provided with a cylindrical inner space 116, of which the axis does not coincide with the axis of the body 113. In this form the fixing element is particularly well suited as one of the supporting elements in a polygonal mirror according to the invention, in which the supporting elements are cylinders. A slot 117 is made in the wall of the body 113 and in parallel to the axis of the body 113. The inner part 114 consists of a cylindrical part 118 provided with an axial groove 119 and with two cylindrical ends 120 and 122 of greater diameter. The diameters of the ends 120 and 122 are equal to each other and are equal to the diameter of the cylindrical inner space 116 in the body 113. As shown in FIG. 9, the end 120 is provided with a hexagonal socket 121 for receving a suitable element, such as an Allen key, for rotating the inner part 114 when it is present in the inner space 116. The end 122 is provided with a conical wall bore 123 and is divided by four grooves 124, 125, 126 and 127. Because of the grooves 124 to 127 the four parts forming the end 122 can move slightly outwards radially. In the centre of the bore 123 a screw hole 128 is made for receiving the screw 115, of which the conical head 129 fits in the bore 123. Slot 117 runs obliquely from its intersection with the outer cylindrical surface of the body 113 to intersect the inner cylindrical wall of space 116, so that the plane of slot 117 almost but not quite intersects part 118 of the inner part 114 when that is installed in the inner space 116.

Ends 111 and 112 are fixed as follows. The inner part 114 is introduced into the inner space 116 before screw 115 is inserted and/or tightened. The inner part 114 can then be rotated in the inner space 116, until the groove 119 is situated opposite to the slot 117. The ends 111 and 112 are now passed through the slot 117 into the groove 119. After the ends 111 and 112 have been taken up in the groove 119, the inner part 114 is rotated in the direction of the arrow A, for instance with the aid of an Allen key in the hexagonal socket 121. In this way the strip 27 is tightened firmly round the supporting elements. When the strip 27 is tightened firmly enough, the screw 115 is fastened for instance also with an Allen key. For that purpose the head 129 is provided with a hexagonal socket 130. By tightening the screw 115, the conical head 129 is pulled into the bore 123 and thus pushes the four parts of the end 122 outwards against the wall of the inner space 116. In this way the inner part 114 is clamped in the inner space 116, and ends 111 and 112 are fixed. In the case of a polygonal mirror of which the supporting elements consist of cylinders which have been installed round a central cylinder, such as that of FIG. 2, and of which the body 113 is one of the cylinders, the preceding procedure can be carried out, before the covers 29 and 30 (FIG. 2) are installed. However, preferably the covers 29 and 30 are each provided with a hole near the place where the screw 115 or the end 120 is situated, and the strip 27 is tightened round the cylinders after the covers 29 and 30 have been installed. Through the holes, made in the covers, the Allen keys for fastening the screw 115 or for rotating the inner part 114 can be inserted through the holes.

From the above it may have become clear, that the cylindricality of the body 113 and the cylindricality of the inner space 116 are not essential for obtaining a fixing element, with which, with a few simple manipulations, the strip 27 can be tightened round the supporting elements. Other forms are equally well possible, as long as the inner part 114 can be rotated in the inner space 116. The mutual proportions between the inner space 116 and the body 113 can also be chosen freely within wide limits.

Other methods for fixing the inner part 114 in the inner space 116 are also possible, for instance gluing or using a clamping screw which extends through the body 113 into the inner space 116.

We claim:

1. A polygonal mirror, comprising a plurality of mirror surfaces arranged round an axis of rotation, each of which surfaces is inclined equally to the axis of rotation, characterized in that the mirror comprises a reflecting foil tightened over a plurality of supporting elements arranged round the axis of rotation.

2. A polygonal mirror according to claim 1, characterized in that the supporting elements are located rotationally symmetrically relative to the axis of rotation.

3. A polygonal mirror according to claim 2, characterized in that the supporting elements are cylinders.

4. A polygonal mirror according to claim 3, characterized in that the cylinders comprise a plurality of first cylinders, all of equal outer diameter and each touching two neighboring first cylinders, and a central cylinder the axis of which coincides with the axis of rotation of the mirror.

5. A polygonal mirror according to claim 4, characterized in that it has six first cylinders.

6. A polygonal mirror according to claim 4, characterized in that a plurality of equal diameter second cylinders are positioned, each touching two of the first cylinders and being of smaller diameter than the first cylinders.

7. A polygonal mirror according to claim 6, characterized in that the outer diameter R of the first cylinders and the outer diameter r of the second cylinders comply with the relation:

$$\frac{r}{R} = \frac{\tan X/2}{\tan X/4} [1 + 2\tan(X/2)\tan(X/4) - \sqrt{\tan^2(X/2)\tan^2(X/4) + \tan(X/2)\tan(X/4)}\,]$$

in which X is the magnitude of the angle of a regular 2n-angle, in which n is the number of first cylinders.

8. A polygonal mirror according to claim 1, 2, 3, 4, 5, 6 or 7, characterized in that the foil is in the form of a strip, and in that at least one fixing element for the ends of said strip of foil is provided.

9. A polygonal mirror according to claim 8, characterized in that the fixing element is formed by one of the supporting elements in which a groove has been made, in which groove both ends of the strip of foil are fixed.

10. A polygonal mirror according to claim 9, characterized in that a groove has been made in each of several of the supporting elements, of which supporting elements the center of gravity is situated substantially on the axis of rotation of the mirror and in that means are present to tighten the foil in each of the grooves.

11. A polygonal mirror according to claim 8, characterized in that the fixing element comprises a tubular body having an inner space, which body has been installed in parallel to the axis of rotation within the plane of circumference of the polygonal mirror and is provided with a feed slot for admitting the foil into said inner space, and in that the fixing element comprises an inner part rotatable in the inner space, which inner part is provided with a groove for receiving at least one end of the strip of foil, which groove in one angular position of the inner part in the inner space is situated opposite to and is parallel to the feed slot, and in that means have been installed for fixing the inner part in the inner space.

12. A polygonal mirror according to claim 11, characterized in that the feed slot is situated in a plane parallel to the axis of rotation of the mirror.

13. A polygonal mirror according to claim 11, characterized in that the inner space is cylindrical and in that the fixing means comprise an indented end of the inner part and means which can be fixed to the inner part for increasing the circumference of the indented end.

14. A polygonal mirror according to claim 13, characterized in that the indented end is provided in axial direction with a hole formed with a screw thread and in that the fixable means comprise a screw fitting the screw thread, which screw is conically shaped over at least part of its length.

15. A polygonal mirror according to claim 11, characterized in that the supporting elements are cylinders and the tubular body is one of the cylinders.

16. A polygonal mirror according to claim 11, characterized in that a plurality of the fixing elements has been installed, of which the center of gravity is situated substantially on the axis of rotation of the mirror.

17. A polygonal mirror according to claim 1, 2, 3, 4, 5, 6 or 7, characterized in that the foil consists of a polyester foil coated on at least one side with a thin layer of aluminium.

18. A polygonal mirror according to claim 8, characterized in that the foil is a polyester foil coated on at least one side with a thin layer of aluminum.

19. A polygonal mirror according to claim 9, characterized in that the foil is a polyester foil coated on at least one side with a thin layer of aluminum.

20. A polygonal mirror according to claim 10, characterized in that the foil is a polyester foil coated on at least one side with a thin layer of aluminum.

21. A polygonal mirror according to claim 11, characterized in that the foil is a polyester foil coated on at least one side with a thin layer of aluminum.

* * * * *